June 3, 1930.   F. R. BISHOP   1,761,252
OPHTHALMIC MOUNTING
Filed April 6, 1928

Inventor
Frederick R. Bishop
By David Rines
    Attorney

Patented June 3, 1930

1,761,252

UNITED STATES PATENT OFFICE

FREDERICK RICE BISHOP, OF NORTH ATTLEBORO, MASSACHUSETTS, ASSIGNOR TO THE BISHOP COMPANY, OF NORTH ATTLEBORO, MASSACHUSETTS, A CORPORATION OF MASSACHUSETTS

OPHTHALMIC MOUNTING

Application filed April 6, 1928. Serial No. 267,990.

The present invention relates to ophthalmic mountings, and more particularly to ophthalmic mountings having rims or lenses of octagonal shape, the advantages of which are well known. The chief object of the invention is to provide an improved connection between the octagon-shaped lenses or rims and the bridge of the mounting. Other objects will be explained hereinafter, and will be particularly pointed out in the appended claims.

Figure 1:
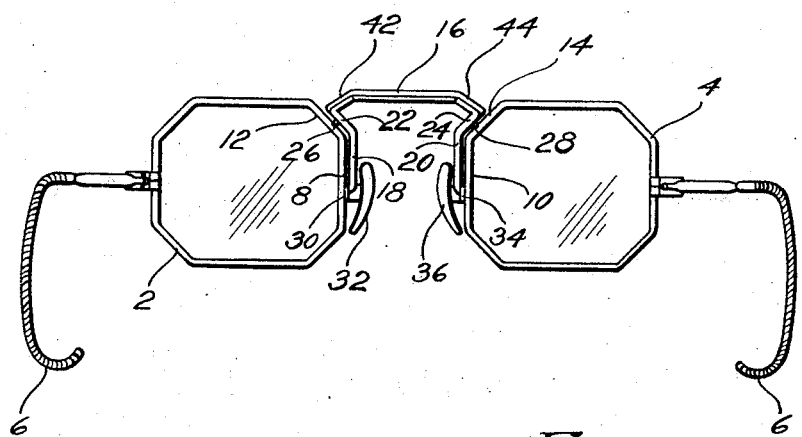
Figure 2:
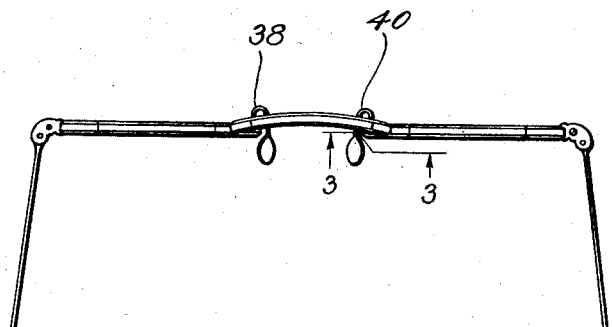
Figure 3:
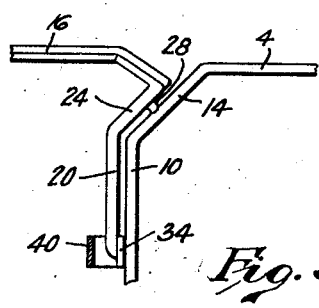

The invention will be explained in connection with the accompanying drawings, in which Fig. 1 is a rear elevation of an ophthalmic mounting constructed according to a preferred embodiment of the present invention; Fig. 2 is a plan of the same; and Fig. 3 is a fragmentary section taken upon the line 3—3 of Fig. 2, looking in the direction of the arrows.

The ophthalmic mounting of the present invention comprises, in its preferred embodiment, two octagon-shaped rims 2 and 4, connected together by a bridge and having temples 6. A side 8 of the rim 2 is disposed adjacent to and substantially parallel to the corresponding side 10 of the rim 4. Another side 12 of the rim 2 is joined to the upper end of the side 8 and slopes away therefrom, upward and to the left, as shown in Fig. 1. A side 14 of the rim 4 is similarly joined to the upper end of the side 10 and slopes away therefrom, upward and to the right.

The bridge is provided with an intermediate portion 16, two terminal portions 18 and 20 and two intermediate portions 22 and 24, the former joining the intermediate portion 16 to the terminal portion 18, and the latter joining the intermediate portion 16 to the terminal portion 20. The terminal portions 18 and 20 are disposed substantially parallel, and close to, the sides 8 and 10, respectively, and the joining portions 22 and 24 are disposed substantially parallel, and close to, the sides 12 and 14. The portion 22 is connected by solder to the side 12 by a short post 26 and the portion 24 to the side 14 by a short post 28. The terminal portion 18 is connected by solder to the side 8 by the end 30 of a guard 32 and the terminal portion 20 is similarly connected by solder to the side 10 by the corresponding end 34 of a guard 36. The length of the posts 26 and 28 is substantially the same as the thickness of the ends 30 and 34 of the guards 32 and 36. The guard arms 38 and 40 of the guards 32 and 36 are bent forward away from the rims and then backward across the plane of the rims, as illustrated more particularly in Fig. 2.

The resulting bridge structure conforms in all respects to the outlines of the sides of the octagon-shaped rims, the portions 20 and 22 being substantially equally spaced from the sides 8 and 12, respectively, and the portions 20 and 24 being similarly substantially equally spaced from the corresponding sides 10 and 14, respectively. The angles of the bridge are sharp to correspond to the angles of the rims, yet the parts are nevertheless securely held together in assembled relation. In order to raise the center 16 of the bridge above the portions 22 and 24—that is, to a point near the wearer's forehead—it is joined thereto at its ends by sides 42 and 44 that slope away from the ends of the portions 22 and 24, respectively, in directions opposite to the direction of slope of the portions 22 and 24, respectively. The intermediate portion 16 of the bridge is bent outward, away from the wearer's forehead, as illustrated in Fig. 2. The portions 16, 42 and 44 of the bridge may lie outside of the plane of the rims, as shown in Fig. 2, but the portions 18, 20, 22 and 24 lie in the plane. Adjustments for pupillary distance may be effected in the portion 16 of the bridge, and the guard arms 38 and 40 may be adjusted in and out to correspond to the bridge adjustment.

It will be understood that the invention may be further modified by persons skilled in the art, and such modifications are considered to be within the spirit and scope of the invention as defined in the appended claims.

What is claimed is:

1. An ophthalmic mounting comprising two octagon-shaped lenses disposed so that two corresponding sides of the lenses are adjacent and substantially parallel to each other, each lens having a side joined to the upper end of each said corresponding side and sloping away from the said upper end, a bridge joining the lenses together having an intermediate portion, two terminal portions and a portion joining each terminal portion to the intermediate portion, the terminal portions being substantially parallel to and spaced from the said corresponding sides, the joining portions being substantially parallel to and spaced from the said sloping sides, and means bridging and connecting each terminal portion and each joining portion to the side to which it is parallel.

2. An ophthalmic mounting comprising two octagon-shaped lenses disposed so that two corresponding sides of the lenses are adjacent and substantially parallel to each other, each lens having a side joined to the upper end of each said corresponding side and sloping away from the said upper end, a bridge joining the lenses together having an intermediate portion, two terminal portions and a portion joining each terminal portion to the intermediate portion, the terminal portions being substantially parallel to and spaced from the said corresponding sides, the joining portions being substantially parallel to and spaced from the said sloping sides, the terminal portions and the joining portions being substantially equally spaced from the sides to which they are respectively parallel, and means bridging and connecting each terminal portion and each joining portion to the side to which it is parallel.

3. An ophthalmic mounting comprising two octagon-shaped lenses disposed so that two corresponding sides of the lenses are adjacent and substantially parallel to each other, each lens having a side joined to the upper end of each said corresponding side and sloping away from the said upper end, a bridge joining the lenses together having an intermediate portion, two terminal portions and a portion joining each terminal portion to the intermediate portion, the terminal portions being substantially parallel to and spaced from the said corresponding sides, the joining portions being substantially parallel to and spaced from the said sloping sides, the intermediate portion being joined to the said joining portions by portions that slope away from the said joining portions in directions opposite to the directions of slope of the said joining portions, and means bridging and connecting each terminal portion and each joining portion to the side to which it is parallel.

4. An ophthalmic mounting comprising two octagon-shaped rims disposed so that two corresponding sides of the rims are adjacent and substantially parallel to each other, each rim having a side joined to the upper end of each said corresponding side and sloping away from the said upper end, a bridge joining the rims together having an intermediate portion, two terminal portions and a portion joining each terminal portion to the intermediate portion, the terminal portions being substantially parallel to and spaced from the said corresponding sides, the joining portions being substantially parallel to and spaced from the said sloping sides, and means bridging and connecting each terminal portion and each joining portion to the side to which it is parallel.

5. An ophthalmic mounting comprising two octagon-shaped rims disposed so that two corresponding sides of the rims are adjacent and substantially parallel to each other, each rim having a side joined to the upper end of each said corresponding side and sloping away from the said upper end, a bridge joining the rims together having an intermediate portion, two terminal portions, and a portion joining each terminal portion to the intermediate portion, the terminal portions being substantially parallel to the said corresponding sides, the joining portions being substantially parallel to the said sloping sides, a guard having a portion disposed between and connecting each terminal portion to the side to which it is parallel, and a post connecting each joining portion to the side to which it is parallel.

6. An ophthalmic mounting comprising two octagon-shaped rims disposed so that two corresponding sides of the rims are adjacent and substantially parallel to each other, each rim having a side joined to the upper end of each said corresponding side and sloping away from the said upper end, a bridge joining the rims together having an intermediate portion, two terminal portions, and a portion joining each terminal portion to the intermediate portion, the terminal portions being substantially parallel to the said corresponding sides, the joining portions being substantially parallel to the said sloping sides, the terminal portions and the joining portions being substantially equally spaced from the sides to which they are respectively parallel, a guard having a portion disposed between and connecting each terminal portion to the side to which it is parallel, and a post connecting each joining portion to the side to which it is parallel.

7. An ophthalmic mounting comprising two octagon-shaped rims disposed so that two corresponding sides of the rims are adjacent and substantially parallel to each other, each rim having a side joined to the upper end of each said corresponding side and sloping away from the said upper end, a bridge joining the rims together having an intermediate portion, two terminal portions, and a portion joining each terminal portion to the intermediate portion, the intermediate portion being raised upward away from the said joining portions and outward away from the forehead of the wearer, the terminal portions being substantially parallel to the said corresponding sides, the joining portions being substantially parallel to the said sloping sides, the terminal portions and the joining portions being substantially equally spaced from the sides to which they are respectively parallel, a guard having a portion disposed between and connecting each terminal portion to the side to which it is parallel, and a post connecting each joining portion to the side to which it is parallel, each guard extending forward away from its rim and then backward across the plane of the rim.

In testimony whereof, I have hereunto subscribed my name.

FREDERICK RICE BISHOP.